(12) United States Patent
Nyarko et al.

(10) Patent No.: US 11,861,275 B2
(45) Date of Patent: Jan. 2, 2024

(54) DIGITAL SIGNAL PROCESSING USING RECURSIVE HIERARCHICAL PARTICLE SWARM OPTIMIZATION

(71) Applicant: Morgan State University, Baltimore, MD (US)

(72) Inventors: Kofi Nyarko, Baltimore, MD (US); Benjamin Hall, Baltimore, MD (US)

(73) Assignee: MORGAN STATE UNIVERSITY, Baltimore, MD (US)

( * ) Notice: Subject to any disclaimer, the term of this patent is extended or adjusted under 35 U.S.C. 154(b) by 568 days.

(21) Appl. No.: 17/187,545

(22) Filed: Feb. 26, 2021

(65) Prior Publication Data

US 2022/0050942 A1 Feb. 17, 2022

Related U.S. Application Data

(60) Provisional application No. 63/054,827, filed on Jul. 22, 2020, provisional application No. 62/983,301, filed on Feb. 28, 2020.

(51) Int. Cl.
*G06F 30/25* (2020.01)

(52) U.S. Cl.
CPC .................. *G06F 30/25* (2020.01)

(58) Field of Classification Search
CPC ....................................... G06F 30/25
See application file for complete search history.

(56) References Cited

U.S. PATENT DOCUMENTS

2019/0013974 A1\* 1/2019 Prothero ................. H04L 27/34

OTHER PUBLICATIONS

Zhang Y, Wang S, Ji G. A comprehensive survey on particle swarm optimization algorithm and its applications. Mathematical problems in engineering. Feb. 2015;2015. (Year: 2015).\*

\* cited by examiner

*Primary Examiner* — Chuen-Meei Gan
(74) *Attorney, Agent, or Firm* — Whiteford, Taylor & Preston, LLP; Peter J. Davis

(57) ABSTRACT

A novel implementation of particle swarm optimization termed Recursive Hierarchical Particle Swarm Optimization (RHPSO) is presented. An improved method for optimizing a complex solution space for any given mathematical function, where the mathematical function may be 1) finding optimal parameters such as topology, security, and routing in distributed/networked systems; 2) finding optimal frequency and channel assignments for telecommunication networks; and 3) code-breaking, searching a large solution space of ciphers for the one correct decryption.

13 Claims, 4 Drawing Sheets

DIGITAL SIGNAL PROCESSING USING RECURSIVE HIERARCHICAL PARTICLE SWARM OPTIMIZATION

BACKGROUND OF THE INVENTION

Field of the Invention

The present invention relates to methods and systems for optimizing complex solution sets for mathematical functions for use in signal processing, network topology, code breaking, and the like.

Description of the Background

Particle Swarm Optimization (PSO) is an optimization technique that possesses several highly desirable qualities. PSO was developed from simulations of synchronous bird flocking and fish schooling behaviors, when the investigators realized that their algorithms possessed numerically efficient optimization characteristics. Given a set of N variables, where an optimized value is sought for each variable, a collection of particles is defined where each particle is assigned a random position in the N-dimensional problem space so that each particle's position corresponds to a candidate solution of the optimization problem. The solutions corresponding to each of these particle positions is scored to obtain a scalar cost based on how well each solves the problem. Governed by both deterministic and stochastic update rules, these particles then fly to a new position in the N-dimensional problem space, which they are then mapped to the problem space and scored. As the particles explore the problem hyperspace, each particle remembers the best position found by any particle in the swarm, called the global best. As the optimization proceeds, particles are pulled toward these known solutions with linear spring-like attraction forces. Controlled oscillations around the optimum solution are combined with stochastic adjustments to explore the d-dimensional problem hyperspace, eventually settling down around a near-optimal solution. However, for complex solution spaces, it is more likely that the algorithm will settle in a local optimal, which may differ significantly from the global optimal solution, as is the case for the Spiral Polynomial Division Multiplexing (SPDM) problem space.

SUMMARY OF THE INVENTION

A novel implementation of particle swarm optimization termed Recursive Hierarchical Particle Swarm Optimization (RHPSO) has been developed and is presented herein. The present invention is an improved method for optimizing a complex solution space for any given mathematical function, where the mathematical function may be 1) finding optimal parameters such as topology, security, and routing in distributed/networked systems; 2) finding optimal frequency and channel assignments for telecommunication networks; and 3) code-breaking, searching a large solution space of ciphers for the one correct decryption.

The RHPSO accelerator of the present invention enables continuous optimization of complex solution spaces. Examples of its use include application to the problem of developing polynomial symbol alphabets under multiple constraints for a new form of signal modulation called Spiral Polynomial Division Multiplexing (SPDM). This modulation scheme is based on representing signals as the transmission of a sequence of polynomials. The polynomials are transmitted using a method for converting polynomials into sinusoids with continuously varying amplitude called "Instantaneous Spectral Analysis" (ISA). For example, where a modulation scheme in which a transmitted signal is represented by a set of polynomial symbol alphabets or other characters, the invention may be used to optimize a resulting output to come up with the best global solution, through an iterative process that seeks a best solution until no new one is found. The output is further optimized by improvements related to the cost function.

As a more specific example, the invention may be implemented in the form of a software product that produces an end result, consisting of a set of optimized polynomial functions or "alphabets" which are useful in the spiral polynomial division multiplexing as described, for example, in U.S. Pat. No. 10,069,664, the disclosure of which is incorporated herein in its entirety.

As another example, the present method of optimization may be used in place of a Monte Carlo simulation, for example, in the case of location measurement acquisition as described in U.S. Pat. No. 8,188,920, the disclosure of which is incorporate herein in its entirety. According to this embodiment of the invention, the Recursive Hierarchical Particle Swarm Optimization method may be used to optimize the number of measurements in order to estimate dilution of precision (DOP) across a service area.

While the embodiments are described with reference to various implementations and exploitations, it will be understood that these embodiments are illustrative and that the scope of the inventive subject matter is not limited to them. In general, techniques for accelerating a particle swarm optimization as described herein may be implemented with facilities consistent with any hardware system or hardware systems in order to optimize a complex solution space for finding optimal parameters such as topology, security, and routing in distributed/networked systems; for finding optimal frequency and channel assignments for telecommunication networks; for code-breaking, searching a large solution space of ciphers for the one correct decryption, for any mathematical function may be 1) finding optimal parameters such as topology, security, and routing in distributed/networked systems; 2) finding optimal frequency and channel assignments for telecommunication networks; and 3) code-breaking, searching a large solution space of ciphers for the one correct decryption.

DETAILED DESCRIPTION

The RHPSO algorithm begins with an initial best candidate solution, which is selected a priori, based on a demonstration of suitability, and then placed within a collection of randomized solutions. A parameterized routine is called to iteratively move the particles through the problem hyperspace by way of a multi objective cost function that is used to update velocity vectors of each particle. Convergence is determined when the value of an iteration counter, which resets with each new update of a global best solution, reaches a given threshold, T. This threshold is a parameter that controls how much branching the algorithm performs. After convergence has been reached, the best solution is stored and recursively passed to the same parameterized routine to be used as a seed for another optimization run, in which that particle solution is combined with fresh round of randomized solutions. This process repeats recursively until an invocation of the routine is encountered where no new best particle is found. This process describes a single branch of a hierarchical search tree. In order to continue branching at each node, a parameter can define the maximum number of branches supported at each level in the tree. Furthermore, by adjusting the value of T, which can be implemented as a percentage of the total iterations allowed for convergence, it is possible for the forking of each branch to be controlled so as to create a search tree with denser or leaner branch structures. Furthermore, exhaustive searches of a given region within the solution space can be prevented by performing a linear search through past best particle solutions and prematurely terminating a branch if the branches' best solution is too similar to others.

Typical PSO solutions discourage premature convergence; however, the RHPSO approach actually leverages this property of PSO to continuously fork the search operations around local optimums and accomplish exploration through the continuous insertion of random particles at each branch point. At the end of each optimization process for a branch, the best particle score is compared with that of the current system global best and set as the system global best if its score exceeds it. This approach results in a continuous process of iterative exploration of a complex solution space in a way that improves on the time needed to converge on a global optimum when compared to other implementations of PSO.

Figure 1:
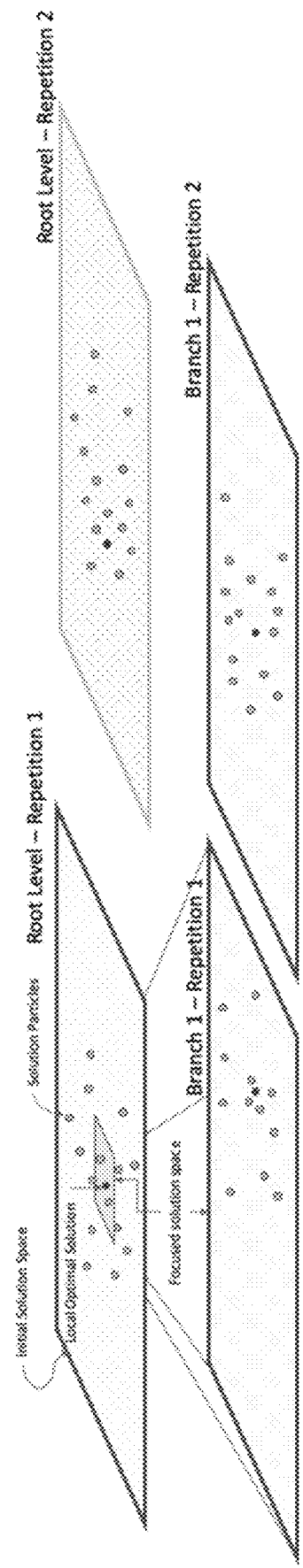
FIG. 1 is a representation of recursive hierarchical particle swarm optimization according to an embodiment of the invention.
Figure 2:
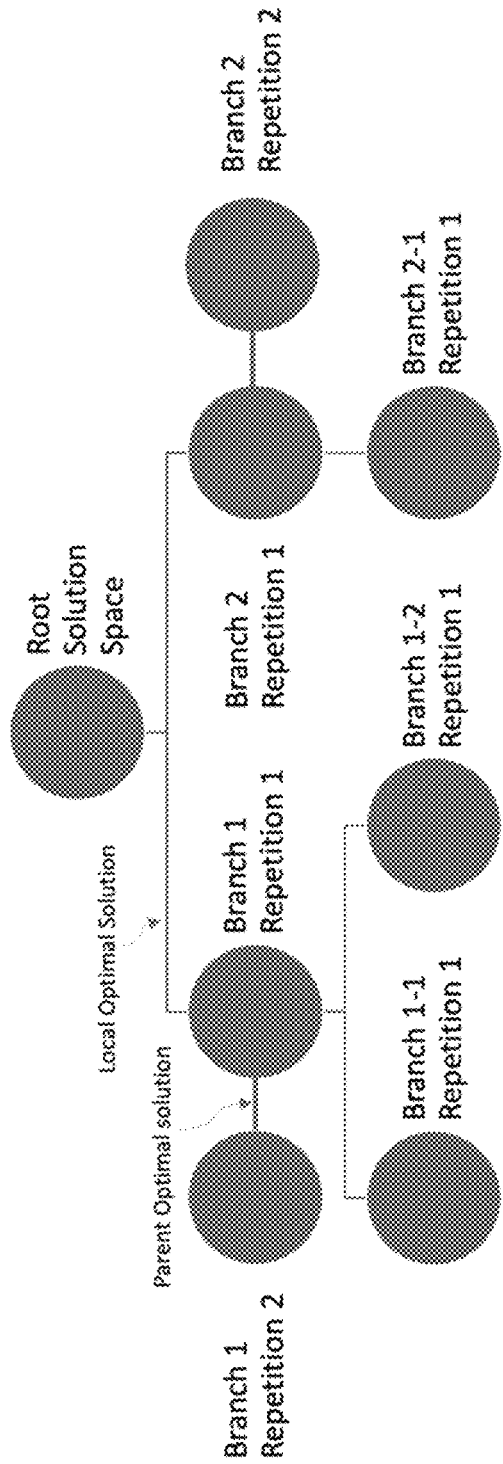
FIG. 2 shows a sample hierarchy according to an embodiment of the invention.
Figure 3:
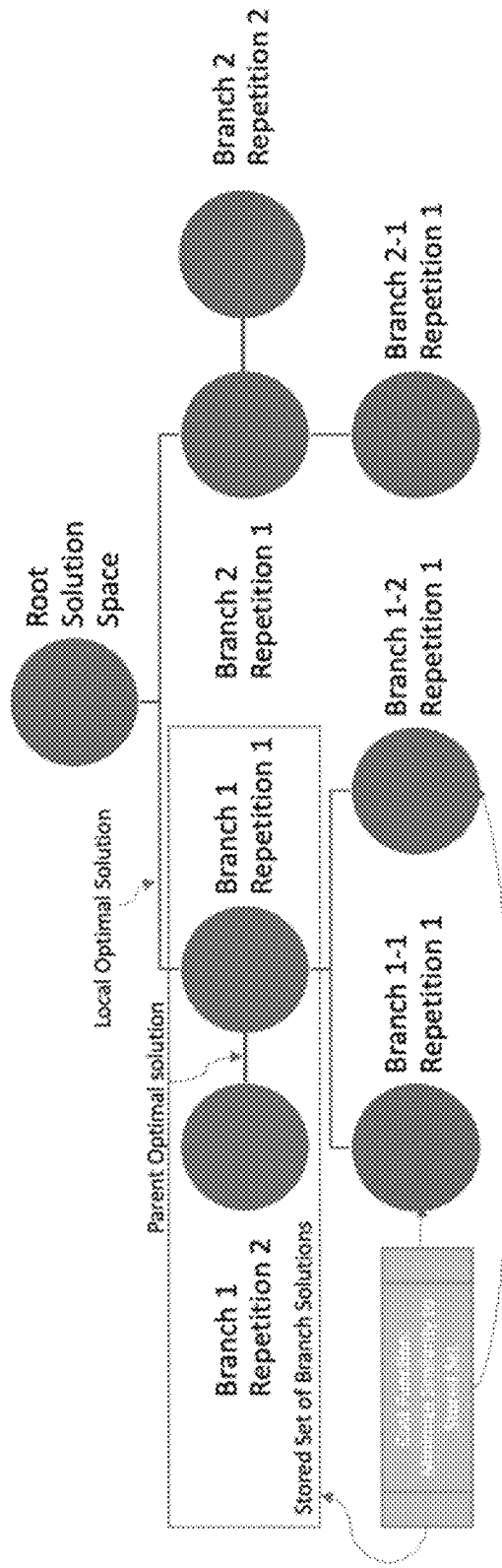
FIG. 3 shows a sample hierarchy with a similarity measure in the cost function according to an embodiment of the invention.

The PSO algorithm has a tendency to quickly converge to a local optimum. While RHPSO leverages this property to recursively search the solution space through the injection of randomized particle solution, this continuous infusion of randomized solutions may not be sufficient to encourage exploration of the solution space in the presence of steep gradients around a local optimum. In such cases, further exploration is encouraged over exploitation by including a similarity measure, which is minimized, in the cost function. At the root of each branch, the particle of the current repetition is stored in a set comprised of the particles across all repetitions of the current branch; see, e.g., FIGS. 1 and 2. This set could be comprised of the parents and children of the branch; however, that will incur a significant cost in computation with diminishing gains. The cost function used in all child branches include a similarity term derived from the comparison of the current solution to all solutions within the set associated with the parent branch, see, e.g., FIG. 3. The similarity term is minimized so as to favor new solutions that are dissimilar to the solutions obtained in all the repetitions in the parent branch.

Due to the stochastic nature of PSO, a significant amount of computation can be wasted on low performing local solutions that serve as the root for a sub-hierarchy that could be comprised of several levels of branching before the algorithm determines the entire root branch to be suboptimal. To mitigate this waste in computation and time, an implementation of RHPSO could elect to generate a set number, k, candidate particle solutions for a branch. After the $k^{th}$ solution is generated, the highest performing solution is selected to be the root particle for a new branch. The value of k can be statically or dynamically set. In the dynamic case, k could be dependent on the branch level since variability in solution particle fitness diminishes with the depth of the solution hierarchy.

Process:
1. Generate an initial best solution (particle)
2. Pass best solution (as seed particle) into parameterized function
   a. Embed seed particle (for current invocation of function) as one particle in a collection of randomly initialized particles
      i. Randomization of initial particles could be based on proximity to seed particle
   b. Set the cost function to be used at current branch level (could remain constant across all branches or set to weight one or more terms as a function of the branch level)
      i. Store all best particle solutions at this branch level within a set
      ii. Calculate the similarity of current solution to all those stored within the set
      iii. Optimize based on minimizing similarity to all solutions within the set
   c. Begin particle swarm optimization with a set maximum number of iterations, M
      i. Reset iteration count whenever a new optimum is found
      ii. Exit the optimization loop when n % of M iterations has occurred (accounting for the fact that the iteration counter resets on each new optimum found);
   d. Repeat steps 2a-2c, K times
   e. Select the best particle from set of K particles (K may be a function of hierarchy depth);
   f. If the best solution particle is different from the initial best solution and the solution particle is not too close to one or more of the previously generated best solution particles across all branches;
      i. Store the current best solution particle;
      ii. Store the current solution score as the best branch solution if the score is better than previous scores at this branch level;
      iii. Recurse the function with the current best solution particle as a new seed particle, then repeat step 2 recursively;
   g. If no improvement on the best solution particle was found or duplicates the best solution found,
      i. Repeat step 2e recursively with the initial seed particle provided at current invocation (repeat k times).

The invention has been implemented in the form of a software product that produces an end result, consisting of a set of optimized polynomial functions or "alphabets" which are useful in the spiral polynomial division multiplexing as described, for example, in U.S. Pat. No. 10,069,664, the disclosure of which is incorporated herein in its entirety. Specifically, there is provided according to an embodiment of the invention, a method for communication including: identifying a set of basis polynomial functions used to generate waveforms, wherein each of the basis polynomial functions in the set of basis polynomial functions is orthogonal to each of the other basis polynomial functions in the set of basis polynomial functions in a coordinate space; combining the set of basis polynomial functions into a message polynomial; convolving the message polynomial with a reference polynomial to produce a transmission polynomial; generating, from the transmission polynomial, a sequence of amplitude values; and transmitting, with a transmitter, a signal based on the sequence of amplitude values.

According to another embodiment, there is provided a method for communicating comprising: identifying a set of basis polynomial functions used to generate waveforms, wherein each of the basis polynomial functions in the set of basis polynomial functions is orthogonal to each of the other basis polynomial functions in the set of basis polynomial functions in a polynomial coefficient space; combining the set of basis polynomial functions into a message polynomial; generating a transmission polynomial comprising the message polynomial; generating, from the transmission polynomial, a sequence of amplitude values; and transmitting, with a transmitter, a signal based on the sequence of amplitude values; assigning a power budget to a rising exponential and a falling exponential of a synchronization pulse; and transmitting a synchronization pulse having a length of one transmission time interval, the synchronization pulse comprising the message polynomial having a plurality of sub-channels, the plurality of sub-channels comprising the rising exponential, the falling exponential, and one or more independently-modulated sub-channels; wherein the rising exponential and the falling exponential are transmitted at a maximum allowable power, the maximum allowable power of each of the rising exponential and the falling exponential summing to the power budget.

According to another embodiment, there is provided a method for communicating, comprising identifying a set of basis polynomial functions used to generate waveforms, wherein each of the basis polynomial functions in the set of basis polynomial functions is orthogonal to each of the other basis polynomial functions in the set of basis polynomial functions in a polynomial coefficient space; combining the set of basis polynomial functions into a message polynomial; performing a dimension reduction step on the message polynomial, the dimension reduction step comprising: identifying a positive integer $n_p$ for which a Taylor term $t^{n_p}/n_p!$ in the message polynomial produces a higher peak value than any other $t^n/n_p!$ over an evaluation interval; determining, by projecting $t^{n_p}/n_p$ onto Cairns space, the projection coefficients for the Cairns functions that collectively generate $t^{n_p}/n_p$; and rotating the coordinate space to ensure that $t^{n_p}/n_p$ will not be generated; generating a transmission polynomial comprising the message polynomial; and, generating, from the transmission polynomial, a sequence of amplitude values; and transmitting, with a transmitter, a signal based on the sequence of amplitude values.

The present invention provides an improved way, according to the aforementioned methods of communicating, to identify the set of basis polynomial functions used to generate the waveforms comprising the following steps:

1. Generate an initial best solution (particle)
2. Pass best solution (as seed particle) into parameterized function
   a. Embed seed particle (for current invocation of function) as one particle in a collection of randomly initialized particles
      i. Randomization of initial particles could be based on proximity to seed particle
   b. Set the cost function to be used at current branch level (could remain constant across all branches or set to weight one or more terms as a function of the branch level)
      i. Store all best particle solutions at this branch level within a set
      ii. Calculate the similarity of current solution to all those stored within the set
      iii. Optimize based on minimizing similarity to all solutions within the set
   c. Begin particle swarm optimization with a set maximum number of iterations, M
      i. Reset iteration count whenever a new optimum is found
      ii. Exit the optimization loop when n % of M iterations has occurred (accounting for the fact that the iteration counter resets on each new optimum found);
   d. Repeat steps 2a-2c, K times
   e. Select the best particle from set of K particles (K may be a function of hierarchy depth);
   f. If the best solution particle is different from the initial best solution and the solution particle is not too close to one or more of the previously generated best solution particles across all branches;
      i. Store the current best solution particle;
      ii. Store the current solution score as the best branch solution if the score is better than previous scores at this branch level;
      iii. Recurse the function with the current best solution particle as a new seed particle, then repeat step 2 recursively;
   g. If no improvement on the best solution particle was found or duplicates the best solution found,
      i. Repeat step 2e recursively with the initial seed particle provided at current invocation (repeat k times).

This type of global optimization disclosed above in connection with the generation of polynomial alphabets for use in spiral polynomial division multiplexing can be applied into other fields of use, including in 1) distributed/networked systems, finding optimal parameters such as topology, security, and routing; 2) frequency and channel assignments for telecommunication networks; and 3) code-breaking, searching a large solution space of ciphers for the one correct decryption.

For example, the present method of optimization may be used in place of a Monte Carlo simulation, for example, in the case of location measurement acquisition as described in U.S. Pat. No. 8,188,920, the disclosure of which is incorporate herein in its entirety. According to this embodiment of the invention, the Recursive Hierarchical Particle Swarm Optimization method may be used to optimize the number of measurements in order to estimate dilution of precision (DOP) across a service area. Where the Monte Carlo simulation potentially requires significant processing power (depending on the number of iterations in the Monte Carlo simulation), the present invention could reduce the overall computational power required by more quickly converging on a suitable output indicative of the probable number of measurements required to produce results at varying levels of quality.

Location determination in a wireless network usually starts with a coarse location based on the serving area of the base station. For any given serving area, the location determination element can use information about the surrounding network to determine the most likely number of measurements required.

This uses the geometry of the surrounding base stations (radio transmitters) and the likelihood that each can be successfully measured. The DOP can vary for different points within the serving area of the base station, so determining the actual expected value could also differ greatly. To reduce the complexity of this model, the RHPSO simulation may be used, taking randomly distributed points within the serving area. This can be used to produce information on the likely distribution of the DOP within the serving area.

Accordingly, there is provided according to the invention a method of optimizing the number of measurements requested in a service area, comprising: selecting a level of uncertainty; determining a set of radio transmitters that transmit signals capable of being received in the serving area; determining a metric across the service area based on at least the geometry of each of the radio transmitters within the set with respect to a plurality of randomly distributed points across the area; and determining the number of measurements required at a location within the area based on at least the metric and the level of uncertainty, wherein the step of determining the number of measurements required at a location within the area based on at least the metric and the level of uncertainty comprises:

1. Selecting an initial number of measurements as a seed particle;
2. Passing said seed particle into a parameterized function;
   a. Embedding said seed particle (for current invocation of function) as one particle in a collection of randomly initialized particles;
      i. Where randomization of initial particles is optionally based on proximity to the seed particle;
   b. Setting a cost function to be used at a current branch level, where the cost function may remain constant across all branches or set to weight one or more terms as a function of a branch level;
      i. Storing all best particle solutions at each branch level within a set;
      ii. Calculating the similarity of current solution to all solutions stored within said set;
      iii. Optimizing based on minimizing similarity to all solutions within said set;
   c. Beginning particle swarm optimization with a set maximum number of iterations, M;
      i. Resetting iteration count whenever a new optimum is found;
      ii. Exiting the optimization loop when n % of M iterations has occurred (accounting for the fact that the iteration counter resets on each new optimum found);
   d. Repeating steps 2a-2c, K times;
   e. Selecting a best particle from a set of K particles, where K may be a function of hierarchy depth;
   f. If the best solution particle is different from the seed particle and the solution particle is not too close to one or more of the previously generated best solution particles across all branches; then
      i. Storing the current best solution particle;
      ii. Storing a current solution score as a best branch solution if the current solution score is better than previous scores at a same branch level;
      iii. Recursing the function with the current best solution particle as a new seed particle, then repeat step 2 recursively;
   g. If no improvement on the best solution particle was found or duplicates the best solution found,
      i. Repeating step 2e recursively with the initial seed particle provided at current invocation (repeat K times).

The foregoing method may be used in connection with any location determination technology in a wireless network that uses measurements from multiple radio transmitters, including but not limited to OTDOA (UMTS, LTE, WiMAX), U-TDOA (GSM, UMTS, LTE), RTT (UMTS, WiMAX), TA (GSM, LTE), Signal strength (any wireless network).

According to yet another embodiment, the present method of optimization may be used in place of the accelerating particle-swarm algorithms described in U.S. Pat. No. 10,437,948, the disclosure of which is incorporated herein in its entirety. According to this embodiment of the invention, the Recursive Hierarchical Particle Swarm Optimization method may be used to optimize a complex solution space for any given mathematical function, where the mathematical function may be 1) finding optimal parameters such as topology, security, and routing in distributed/networked systems; 2) finding optimal frequency and channel assignments for telecommunication networks; and 3) code-breaking, searching a large solution space of ciphers for the one correct decryption. According to this embodiment, there is provided according to the invention, a method for accelerating a particle swarm optimization for a solution space for a parameterized function, comprising 1. Generating, via one or more processors, an initial best solution for a parameterized function as a seed particle;
2. Passing, via the one or more processors, said seed particle into said parameterized function;
   a. Embedding, via the one or more processors, said seed particle (for current invocation of function) as one particle in a collection of randomly initialized particles;
      i. Where randomization of initial particles is optionally based on proximity to the seed particle;
   b. Setting, via the one or more processors, a cost function to be used at a current branch level, where the cost function may remain constant across all branches or set to weight one or more terms as a function of a branch level;
      i. Storing, via the one or more processors, all best particle solutions at each branch level within a set;
      ii. Calculating, via the one or more processors, the similarity of current solution to all solutions stored within said set;
      iii. Optimizing, via the one or more processors, based on minimizing similarity to all solutions within said set;
   c. Beginning, via the one or more processors, particle swarm optimization with a set maximum number of iterations, M;
      i. Resetting, via the one or more processors, iteration count whenever a new optimum is found;
      ii. Exiting the optimization loop when n % of M iterations has occurred (accounting for the fact that the iteration counter resets on each new optimum found);
   d. Repeating, via the one or more processors, steps 2a-2c, K times;
   e. Selecting, via the one or more processors, a best particle from a set of K particles, where K may be a function of hierarchy depth;
   f. If the best solution particle is different from the seed particle and the solution particle is not too close to one or more of the previously generated best solution particles across all branches; then
      i. Storing, via the one or more processors, the current best solution particle;
      ii. Storing, via the one or more processors, a current solution score as a best branch solution if the current solution score is better than previous scores at a same branch level;
    iii. Recursing, via the one or more processors, the function with the current best solution particle as a new seed particle, then repeat step 2 recursively;
  g. Determining, via the one or more processors, whether no improvement on the best solution particle was found or duplicates the best solution found,
    i. If no improvement on the best solution particle was determined or duplicates the best solution found; Repeating, via the one or more processors, step 2e recursively with the initial seed particle provided at current invocation (repeat K times).

According to a related embodiment, there is provided an apparatus for accelerating a particle swarm optimization comprising: a processor; and a computer readable storage medium having computer usable program code embodied therewith, the computer usable program code executable by the processor to cause the apparatus to accelerate a particle swarm optimization, the program code including:

1. Program code to generate, via the processor, an initial best solution for a parameterized function as a seed particle;
2. Program code to pass, via the processor, said seed particle into said parameterized function;
  a. Program code to embed, via the processors, said seed particle (for current invocation of function) as one particle in a collection of randomly initialized particles;
    i. Where randomization of initial particles is optionally based on proximity to the seed particle;
  b. Program code to set, via the processor, a cost function to be used at a current branch level, where the cost function may remain constant across all branches or set to weight one or more terms as a function of a branch level;
    i. Program code to store, via the processor, all best particle solutions at each branch level within a set;
    ii. Program code to calculate, via the processor, the similarity of current solution to all solutions stored within said set;
    iii. Program code to optimize, via the processor, based on minimizing similarity to all solutions within said set;
  c. Program code to begin, via the processor, particle swarm optimization with a set maximum number of iterations, M;
    i. Program code to reset, via the processor, iteration count whenever a new optimum is found;
    ii. Program code to exit the optimization loop when n % of M iterations has occurred (accounting for the fact that the iteration counter resets on each new optimum found);
  d. Program code to repeat, via the processor, steps 2a-2c, K times;
  e. Program code to select, via the processor, a best particle from a set of K particles, where K may be a function of hierarchy depth;
  f. Program code to determine, via the processor, whether the best solution particle is different from the seed particle and the solution particle is not too close to one or more of the previously generated best solution particles across all branches; then if the best solution particle is different from the seed particle and the solution particle is not too close to one or more of the previously generated best solution particles across all branches,
    i. Program code to store, via the processor, the current best solution particle;
    ii. Program code to storing, via the processor, a current solution score as a best branch solution if the current solution score is better than previous scores at a same branch level;
    iii. Program code to recurse, via the processor, the function with the current best solution particle as a new seed particle, then repeat step 2 recursively;
  g. Program code to determine, via the processor, whether no improvement on the best solution particle was found or duplicates the best solution found,
    i. If no improvement on the best solution particle was determined or duplicates the best solution found; program code to repeat via the processor, step 2e recursively with the initial seed particle provided at current invocation (repeat K times).

According to a related embodiment, there is provided a computer program product for accelerating a particle swarm optimization, the computer program product comprising: a computer readable storage medium having computer usable program code embodied therewith, the computer usable program code comprising a computer usable program code to:

1. Generate, via at least one processor, an initial best solution for a parameterized function as a seed particle;
2. Pass, via said at least one processor, said seed particle into said parameterized function;
  a. Embed, via said at least one processor, said seed particle (for current invocation of function) as one particle in a collection of randomly initialized particles;
    i. Where randomization of initial particles is optionally based on proximity to the seed particle;
  b. Setting, via said at least one processor, a cost function to be used at a current branch level, where the cost function may remain constant across all branches or set to weight one or more terms as a function of a branch level;
    i. Storing, via said at least one processor, all best particle solutions at each branch level within a set;
    ii. Calculating, via said at least one processor, the similarity of current solution to all solutions stored within said set;
    iii. Optimizing, via said at least one processor, based on minimizing similarity to all solutions within said set;
  c. Beginning, via said at least one processor, particle swarm optimization with a set maximum number of iterations, M;
    i. Resetting, via said at least one processor, iteration count whenever a new optimum is found;
    ii. Exiting the optimization loop when n % of M iterations has occurred (accounting for the fact that the iteration counter resets on each new optimum found);
  d. Repeating, via said at least one processor, steps 2a-2c, K times;
  e. Selecting, via said at least one processor, a best particle from a set of K particles, where K may be a function of hierarchy depth;
  f. If the best solution particle is different from the seed particle and the solution particle is not too close to one or more of the previously generated best solution particles across all branches; then
    i. Storing, via said at least one processor, the current best solution particle;

ii. Storing, via said at least one processor, a current solution score as a best branch solution if the current solution score is better than previous scores at a same branch level;

iii. Recursing, via said at least one processor, the function with the current best solution particle as a new seed particle, then repeating step 2 recursively;

g. Determining, via said at least one processor, whether no improvement on the best solution particle was found or duplicates the best solution found, i. If no improvement on the best solution particle was determined or duplicates the best solution found; repeating, via said at least one processor, step 2e recursively with the initial seed particle provided at current invocation (repeat K times).

As will be appreciated by one skilled in the art, aspects of the inventive subject matter may be embodied as a system, method or computer program product. Accordingly, aspects of the inventive subject matter may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the inventive subject matter may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the inventive subject matter may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the inventive subject matter are described with reference to flowchart illustrations and/or block diagrams of methods, apparatus (systems) and computer program products according to embodiments of the inventive subject matter. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

Figure 4:
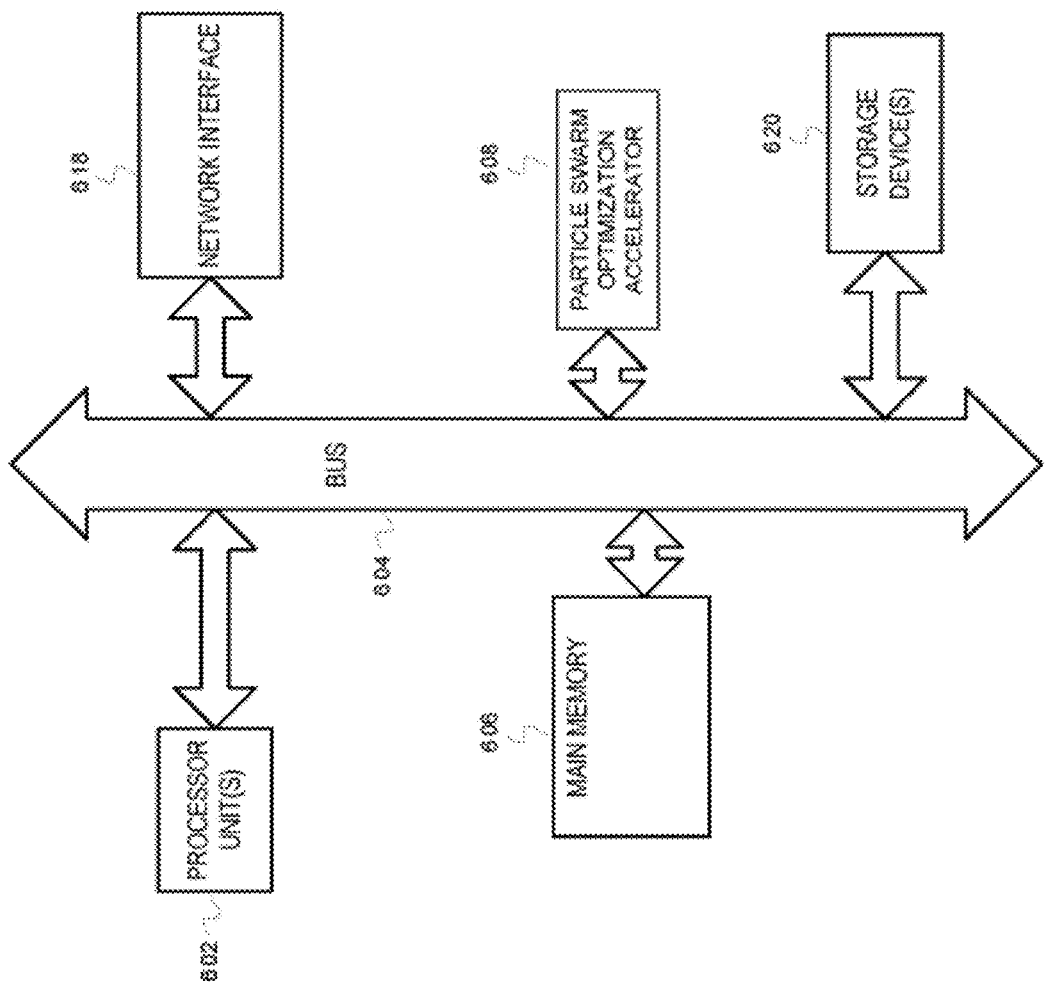
FIG. 4 depicts an example computer system with a particle swarm optimization accelerator.

FIG. 4 depicts an example computer system with a particle swarm optimization accelerator. A computer system includes a processor unit 602 (possibly including multiple processors, multiple cores, multiple nodes, and/or implementing multi-threading, etc.). The computer system includes memory 606. The memory 606 may be system memory (e.g., one or more of cache, SRAM, DRAM, zero capacitor RAM, Twin Transistor RAM, eDRAM, EDO RAM, DDR RAM, EEPROM, NRAM, RRAM, SONOS, PRAM, etc.) or any one or more of the above already described possible realizations of machine-readable media. The computer system also includes a bus 604 (e.g., PCI, ISA, PCI-Express, HyperTransport® bus, InfiniBand® bus, NuBus bus, etc.), a network interface 618 (e.g., an ATM interface, an Ethernet interface, a Frame Relay interface, SONET interface, wireless interface, etc.), and a storage device(s) 620 (e.g., optical storage, magnetic storage, etc.). The computer system also includes a particle swarm optimization accelerator ("accelerator") 608. This accelerator 608 uses recursive hierarchical approach to accelerate the particle swarm optimization. Any one of the functionalities may be partially (or entirely) implemented in hardware and/or on the processing unit 602. For example, the functionality may be implemented with an application specific integrated circuit, in logic implemented in the processing unit 602, in a co-processor on a peripheral device or card, etc. Further, realizations may include fewer or additional components not illustrated in FIG. 4 (e.g., video cards, audio cards, additional network interfaces, peripheral devices, etc.). The processor unit 602, the storage device(s) 620, and the network interface 618 are coupled to the bus 604. Although illustrated as being coupled to the bus 604, the memory 606 may be coupled to the processor unit 602.

While the embodiments are described with reference to various implementations and exploitations, it will be understood that these embodiments are illustrative and that the scope of the inventive subject matter is not limited to them. In general, techniques for accelerating a particle swarm optimization as described herein may be implemented with facilities consistent with any hardware system or hardware systems. Many variations, modifications, additions, and improvements are possible.

Plural instances may be provided for components, operations or structures described herein as a single instance. Finally, boundaries between various components, operations and data stores are somewhat arbitrary, and particular operations are illustrated in the context of specific illustrative configurations. Other allocations of functionality are envisioned and may fall within the scope of the inventive subject matter. In general, structures and functionality presented as separate components in the example configurations may be implemented as a combined structure or component. Similarly, structures and functionality presented as a single component may be implemented as separate components. These and other variations, modifications, additions, and improvements may fall within the scope of the inventive subject matter.

The invention claimed is:

1. A method for communicating comprising: identifying a set of basis polynomial functions used to generate waveforms, wherein each of the basis polynomial functions in the set of basis polynomial functions is orthogonal to each of the other basis polynomial functions in the set of basis polynomial functions in a polynomial coefficient space; combining the set of basis polynomial functions into a message polynomial; generating a transmission polynomial comprising the message polynomial; generating, from the transmission polynomial, a sequence of amplitude values; and transmitting, with a transmitter, a signal based on the sequence of amplitude values; transmitting a synchronization pulse having a length of one transmission time interval, the synchronization pulse comprising the message polynomial having a plurality of sub-channels, the plurality of sub-channels comprising a rising exponential having a peak amplitude, a falling exponential having a peak amplitude equal to the peak amplitude of the rising exponential, and one or more sub-channels set to amplitude zero, wherein the step of identifying a set of basis polynomial functions used to generate waveforms comprises:
　　1. Generating an initial set of basis polynomial functions as a seed particle;
　　2. Passing said seed particle into a parameterized function;
　　　a. Embedding said seed particle (for current invocation of function) as one particle in a collection of randomly initialized particles;
　　　　i. where randomization of initial particles is optionally based on proximity to the seed particle;
　　　b. Setting a cost function to be used at a current branch level, where the cost function may remain constant across all branches or set to weight one or more terms as a function of a branch level;
　　　　i. Storing all best particle solutions at each branch level within a set;
　　　　ii. Calculating the similarity of current solution to all solutions stored within said set;
　　　　iii. Optimizing based on minimizing similarity to all solutions within said set;
　　　c. Beginning particle swarm optimization with a set maximum number of iterations, M;
　　　　i. Resetting iteration count whenever a new optimum is found;
　　　　ii. Exiting the optimization loop when n % of M iterations has occurred (accounting for the fact that the iteration counter resets on each new optimum found);
　　　d. Repeating steps 2a-2c, K times;
　　　e. Selecting a best particle from a set of K particles, where K may be a function of hierarchy depth;
　　　f. If the best solution particle is different from the seed particle and the solution particle is not too close to one or more of the previously generated best solution particles across all branches; then
　　　　i. Storing the current best solution particle;
　　　　ii. Storing a current solution score as a best branch solution if the current solution score is better than previous scores at a same branch level;
　　　　iii. Recursing the function with the current best solution particle as a new seed particle, then repeat step 2 recursively;
　　　g. If no improvement on the best solution particle was found or duplicates the best solution found,
　　　　i. Repeating step 2e recursively with the initial seed particle provided at current invocation (repeat K times).

2. A method for communicating comprising: identifying a set of basis polynomial functions used to generate waveforms, wherein each of the basis polynomial functions in the set of basis polynomial functions is orthogonal to each of the other basis polynomial functions in the set of basis polynomial functions in a polynomial coefficient space; combining the set of basis polynomial functions into a message polynomial; generating a transmission polynomial comprising the message polynomial; generating, from the transmission polynomial, a sequence of amplitude values; and transmitting, with a transmitter, a signal based on the sequence of amplitude values; assigning a power budget to a rising exponential and a falling exponential of a synchronization pulse; and transmitting a synchronization pulse having a length of one transmission time interval, the synchronization pulse comprising the message polynomial having a plurality of sub-channels, the plurality of sub-channels comprising the rising exponential, the falling exponential, and one or more independently-modulated sub-channels; wherein the rising exponential and the falling exponential are transmitted at a maximum allowable power, the maximum allowable power of each of the rising exponential and the falling exponential summing to the power budget, wherein the step of identifying a set of basis polynomial functions used to generate waveforms comprises:
　　1. Generating an initial set of basis polynomial functions as a seed particle;

2. Passing said seed particle into a parameterized function;
   a. Embedding said seed particle (for current invocation of function) as one particle in a collection of randomly initialized particles;
      i. Where randomization of initial particles is optionally based on proximity to the seed particle;
   b. Setting a cost function to be used at a current branch level, where the cost function may remain constant across all branches or set to weight one or more terms as a function of a branch level;
      i. Storing all best particle solutions at each branch level within a set;
      ii. Calculating the similarity of current solution to all solutions stored within said set;
      iii. Optimizing based on minimizing similarity to all solutions within said set;
   c. Beginning particle swarm optimization with a set maximum number of iterations, M;
      i. Resetting iteration count whenever a new optimum is found;
      ii. Exiting the optimization loop when n % of M iterations has occurred (accounting for the fact that the iteration counter resets on each new optimum found);
   d. Repeating steps 2a-2c, K times;
   e. Selecting a best particle from a set of K particles, where K may be a function of hierarchy depth;
   f. If the best solution particle is different from the seed particle and the solution particle is not too close to one or more of the previously generated best solution particles across all branches; then
      i. Storing the current best solution particle;
      ii. Storing a current solution score as a best branch solution if the current solution score is better than previous scores at a same branch level;
      iii. Recursing the function with the current best solution particle as a new seed particle, then repeat step 2 recursively;
   g. If no improvement on the best solution particle was found or duplicates the best solution found,
      i. Repeating step 2e recursively with the initial seed particle provided at current invocation (repeat K times).

3. A method for communicating, comprising identifying a set of basis polynomial functions used to generate waveforms, wherein each of the basis polynomial functions in the set of basis polynomial functions is orthogonal to each of the other basis polynomial functions in the set of basis polynomial functions in a polynomial coefficient space; combining the set of basis polynomial functions into a message polynomial; performing a dimension reduction step on the message polynomial, the dimension reduction step comprising: identifying a positive integer $n_p$ for which a Taylor term $t^n_p/n_p!$ in the message polynomial produces a higher peak value than any other $t^n/n_p!$ over an evaluation interval; determining, by projecting $t^{n_p}/n_p$ onto Cairns space, the projection coefficients for the Cairns functions that collectively generate $t^{n_p}/n_p$; and rotating the coordinate space to ensure that $t^{n_p}/n_p$ will not be generated; generating a transmission polynomial comprising the message polynomial; and, generating, from the transmission polynomial, a sequence of amplitude values; and transmitting, with a transmitter, a signal based on the sequence of amplitude values, wherein the step of identifying a set of basis polynomial functions used to generate waveforms comprises:

1. Generating an initial set of basis polynomial functions as a seed particle;
2. Passing said seed particle into a parameterized function;
   a. Embedding said seed particle (for current invocation of function) as one particle in a collection of randomly initialized particles;
      i. where randomization of initial particles is optionally based on proximity to the seed particle;
   b. Setting a cost function to be used at a current branch level, where the cost function may remain constant across all branches or set to weight one or more terms as a function of a branch level;
      i. Storing all best particle solutions at each branch level within a set;
      ii. Calculating the similarity of current solution to all solutions stored within said set;
      iii. Optimizing based on minimizing similarity to all solutions within said set;
   c. Beginning particle swarm optimization with a set maximum number of iterations, M;
      i. Resetting iteration count whenever a new optimum is found;
      ii. Exiting the optimization loop when n % of M iterations has occurred (accounting for the fact that the iteration counter resets on each new optimum found);
   d. Repeating steps 2a-2c, K times;
   e. Selecting a best particle from a set of K particles, where K may be a function of hierarchy depth;
   f. If the best solution particle is different from the seed particle and the solution particle is not too close to one or more of the previously generated best solution particles across all branches; then
      i. Storing the current best solution particle;
      ii. Storing a current solution score as a best branch solution if the current solution score is better than previous scores at a same branch level;
      iii. Recursing the function with the current best solution particle as a new seed particle, then repeat step 2 recursively;
   g. If no improvement on the best solution particle was found or duplicates the best solution found,
      i. Repeating step 2e recursively with the initial seed particle provided at current invocation (repeat K times).

4. A method of optimizing the number of measurements requested in a service area, comprising:
selecting a level of uncertainty; determining a set of radio transmitters that transmit signals capable of being received in the serving area; determining a metric across the service area based on at least the geometry of each of the radio transmitters within the set with respect to a plurality of randomly distributed points across the area; and determining the number of measurements required at a location within the area based on at least the metric and the level of uncertainty, wherein the step of determining the number of measurements required at a location within the area based on at least the metric and the level of uncertainty comprises:

1. Selecting an initial number of measurements as a seed particle;
2. Passing said seed particle into a parameterized function;

a. Embedding said seed particle (for current invocation of function) as one particle in a collection of randomly initialized particles;
   i. where randomization of initial particles is optionally based on proximity to the seed particle;
b. Setting a cost function to be used at a current branch level, where the cost function may remain constant across all branches or set to weight one or more terms as a function of a branch level;
   i. Storing all best particle solutions at each branch level within a set;
   ii. Calculating the similarity of current solution to all solutions stored within said set;
   iii. Optimizing based on minimizing similarity to all solutions within said set;
c. Beginning particle swarm optimization with a set maximum number of iterations, M;
   i. Resetting iteration count whenever a new optimum is found;
   ii. Exiting the optimization loop when n % of M iterations has occurred (accounting for the fact that the iteration counter resets on each new optimum found);
d. Repeating steps 2a-2c, K times;
e. Selecting a best particle from a set of K particles, where K may be a function of hierarchy depth;
f. If the best solution particle is different from the seed particle and the solution particle is not too close to one or more of the previously generated best solution particles across all branches; then
   i. Storing the current best solution particle;
   ii. Storing a current solution score as a best branch solution if the current solution score is better than previous scores at a same branch level;
   iii. Recursing the function with the current best solution particle as a new seed particle, then repeat step 2 recursively;
g. If no improvement on the best solution particle was found or duplicates the best solution found,
   i. Repeating step 2e recursively with the initial seed particle provided at current invocation (repeat K times).

5. The method of claim 4, wherein the metric is dilution of precision (DOP).

6. The method of claim 4, wherein the metric is a predicted uncertainty.

7. The method of claim 4, comprising: determining a measurement error standard deviation based at least on the metric and the level of uncertainty; determining the number of measurements required to obtain the measurement error standard deviation based on a plurality of measurements.

8. The method of claim 7, wherein the plurality of measurements represents simulated measurements.

9. The method of claim 7, wherein the plurality of measurements represents historical measurements.

10. The method of claim 4, wherein the step of determining a metric comprises: calculating a dilution of precision (DOP) for each of the plurality of randomly distributed points based on at least a geometry of each radio transmitter in the set with respect to each of the plurality of points; and, modeling a DOP of the area as a function of the calculated DOP for each of the plurality of points.

11. A method for accelerating a particle swarm optimization for finding optimal parameters of an application, the method comprising:
1. Generating, via one or more processors, an initial best solution for a parameterized function as a seed particle;
2. Passing, via the one or more processors, said seed particle into said parameterized function;
   a. Embedding, via the one or more processors, said seed particle (for current invocation of function) as one particle in a collection of randomly initialized particles;
      i. Where randomization of initial particles is optionally based on proximity to the seed particle;
   b. Setting, via the one or more processors, a cost function to be used at a current branch level, where the cost function may remain constant across all branches or set to weight one or more terms as a function of a branch level;
      i. Storing, via the one or more processors, all best particle solutions at each branch level within a set;
      ii. Calculating, via the one or more processors, the similarity of current solution to all solutions stored within said set;
      iii. Optimizing, via the one or more processors, based on minimizing similarity to all solutions within said set;
   c. Beginning, via the one or more processors, particle swarm optimization with a set maximum number of iterations, M;
      i. Resetting, via the one or more processors, iteration count whenever a new optimum is found;
      ii. Exiting the optimization loop when n % of M iterations has occurred (accounting for the fact that the iteration counter resets on each new optimum found);
   d. Repeating, via the one or more processors, steps 2a-2c, K times;
   e. Selecting, via the one or more processors, a best particle from a set of K particles, where K may be a function of hierarchy depth;
   f. If the best solution particle is different from the seed particle and the solution particle is not too close to one or more of the previously generated best solution particles across all branches; then
      i. Storing, via the one or more processors, the current best solution particle;
      ii. Storing, via the one or more processors, a current solution score as a best branch solution if the current solution score is better than previous scores at a same branch level;
      iii. Recursing, via the one or more processors, the function with the current best solution particle as a new seed particle, then repeat step 2 recursively;
   g. Determining, via the one or more processors, whether no improvement on the best solution particle was found or duplicates the best solution found,
      i. If no improvement on the best solution particle was determined or duplicates the best solution found; Repeating, via the one or more processors, step 2e recursively with the initial seed particle provided at current invocation (repeat K times); and
   h. implementing the best solution particle to the application.

12. An apparatus comprising: a processor; and a computer readable storage medium having computer usable program code embodied therewith, the computer usable program code executable by the processor to cause the apparatus to accelerate a particle swarm optimization for finding optimal parameters of an application, the program code including:
1. Program code to generate, via the processor, an initial best solution for a parameterized function as a seed particle;

2. Program code to pass, via the processor, said seed particle into said parameterized function;
   a. Program code to embed, via the processors, said seed particle (for current invocation of function) as one particle in a collection of randomly initialized particles;
      i. where randomization of initial particles is optionally based on proximity to the seed particle;
   b. Program code to set, via the processor, a cost function to be used at a current branch level, where the cost function may remain constant across all branches or set to weight one or more terms as a function of a branch level;
      i. Program code to store, via the processor, all best particle solutions at each branch level within a set;
      ii. Program code to calculate, via the processor, the similarity of current solution to all solutions stored within said set;
      iii. Program code to optimize, via the processor, based on minimizing similarity to all solutions within said set;
   c. Program code to begin, via the processor, particle swarm optimization with a set maximum number of iterations, M;
      i. Program code to reset, via the processor, iteration count whenever a new optimum is found;
      ii. Program code to exit the optimization loop when n % of M iterations has occurred (accounting for the fact that the iteration counter resets on each new optimum found);
   d. Program code to repeat, via the processor, steps 2a-2c, K times;
   e. Program code to select, via the processor, a best particle from a set of K particles, where K may be a function of hierarchy depth;
   f. Program code to determine, via the processor, whether the best solution particle is different from the seed particle and the solution particle is not too close to one or more of the previously generated best solution particles across all branches; then if the best solution particle is different from the seed particle and the solution particle is not too close to one or more of the previously generated best solution particles across all branches,
      i. Program code to store, via the processor, the current best solution particle;
      ii. Program code to storing, via the processor, a current solution score as a best branch solution if the current solution score is better than previous scores at a same branch level;
      iii. Program code to recurse, via the processor, the function with the current best solution particle as a new seed particle, then repeat step 2 recursively;
   g. Program code to determine, via the processor, whether no improvement on the best solution particle was found or duplicates the best solution found,
      i. If no improvement on the best solution particle was determined or duplicates the best solution found; program code to repeat via the processor, step 2e recursively with the initial seed particle provided at current invocation (repeat K times); and
   h. implementing the best solution particle to the application.

13. A non-transitory computer program product for accelerating a particle swarm optimization for finding optimal parameters of an application, the non-transitory computer program product comprising: a non-transitory computer readable storage medium having computer usable program code embodied therewith, the computer usable program code comprising a computer usable program code to:
   1. Generate, via at least one processor, an initial best solution for a parameterized function as a seed particle;
   2. Pass, via said at least one processor, said seed particle into said parameterized function;
      a. Embed, via said at least one processor, said seed particle (for current invocation of function) as one particle in a collection of randomly initialized particles;
         i. Where randomization of initial particles is optionally based on proximity to the seed particle;
      b. Setting, via said at least one processor, a cost function to be used at a current branch level, where the cost function may remain constant across all branches or set to weight one or more terms as a function of a branch level;
         i. Storing, via said at least one processor, all best particle solutions at each branch level within a set;
         ii. Calculating, via said at least one processor, the similarity of current solution to all solutions stored within said set;
         iii. Optimizing, via said at least one processor, based on minimizing similarity to all solutions within said set;
      c. Beginning, via said at least one processor, particle swarm optimization with a set maximum number of iterations, M;
         i. Resetting, via said at least one processor, iteration count whenever a new optimum is found;
         ii. Exiting the optimization loop when n % of M iterations has occurred (accounting for the fact that the iteration counter resets on each new optimum found);
      d. Repeating, via said at least one processor, steps 2a-2c, K times;
      e. Selecting, via said at least one processor, a best particle from a set of K particles, where K may be a function of hierarchy depth;
      f. If the best solution particle is different from the seed particle and the solution particle is not too close to one or more of the previously generated best solution particles across all branches; then
         i. Storing, via said at least one processor, the current best solution particle;
         ii. Storing, via said at least one processor, a current solution score as a best branch solution if the current solution score is better than previous scores at a same branch level;
         iii. Recursing, via said at least one processor, the function with the current best solution particle as a new seed particle, then repeating step 2 recursively;
      g. Determining, via said at least one processor, whether no improvement on the best solution particle was found or duplicates the best solution found,
         i. If no improvement on the best solution particle was determined or duplicates the best solution found; repeating, via said at least one processor, step 2e recursively with the initial seed particle provided at current invocation (repeat K times); and
      h. implementing the best solution particle to the application.

* * * * *